United States Patent
Enrique et al.

[11] Patent Number: 5,859,957
[45] Date of Patent: Jan. 12, 1999

[54] METHOD AND DEVICES FOR THE GENERATION OF PRINTED IMAGES WHICH DEFINE PATTERNS TO BE USED IN GRAPHIC INFORMATION

[76] Inventors: Vial C. Enrique; Lagos I. Miguel, both of Estado 235, Of. 511, Santiago, Chile

[21] Appl. No.: 691,388

[22] Filed: Aug. 2, 1996

[51] Int. Cl.[6] .................................................. G06A 15/00
[52] U.S. Cl. .......................................... 395/116; 395/101
[58] Field of Search ..................................... 395/116, 115, 395/101, 118, 119, 507–510, 763, 788; 388/125, 77; 347/171, 244, 180, 181, 182, 183, 237, 247; 358/296, 462, 471, 474, 494, 443–444, 446, 450

[56] References Cited

U.S. PATENT DOCUMENTS 5,036,356  7/1991  Lo ............................................... 399/77
5,557,413  9/1996  Ebihara .................................... 349/244

*Primary Examiner*—Arthur G. Evans
*Attorney, Agent, or Firm*—Shlesinger Arkwright & Garvey LLP

[57] ABSTRACT

The method and device of the invention includes the storage of a plurality of data or digital information blocks, corresponding to the images to be exhibited. Each one of these blocks is processed by the device, which has the means to read the data blocks, said data of each block being then divided in n vertical bands, n being equal to the total number of cylinder lenses. Later, data corresponding to each band are divided in m sub-bands, m being equal to the number of images to be included in the graphic pattern. Only the data belonging to the sub-bands of the order mentioned below, shall be kept:

$$k_1^m + (j_1^n - 1) \times m$$

k being the k-times image and j the j-times band, with which an intermediate digital block is obtained for each initial data block corresponding to each initial image. Each one of these intermediate blocks gives rise to a terminal block formed by information corresponding to the medium lines of each sub-band selected, of a width of one pixel, keeping the memory address (position) of the corresponding sub-band. Finally, a block of data pattern is formed made up of the merger or integration of each one of the terminal block, keeping their relative addresses, juxtaposing the different sub-bands, which may be stored as a graphic file to be printed.

4 Claims, 4 Drawing Sheets

METHOD AND DEVICES FOR THE GENERATION OF PRINTED IMAGES WHICH DEFINE PATTERNS TO BE USED IN GRAPHIC INFORMATION

BACKGROUND OF THE INVENTION

1. Field of the Invention

The present invention relates to a method and device for the generation of printed images which define patterns to be used in graphic information exhibiting panels of the type made up of a plurality of cylinder, converging lenses arranged parallel each other.

2. Description of the Related Art

A number of arrangements is known for the exhibition of printed images reaching different optic effects. Some of these arrangements resort to a plate formed by a plurality of cylinder, parallel lenses defining a focal plane.

A family of these optic arrangements consists in devices allowing the exhibition of two or more different graphic images, one at a time, depending on the angle formed by the sight with the focal plane of the device. This kind of devices demands that the observer focuses his eyes at the real distance which separates him from the exhibitor. Depending on the structure of the graphic pattern laid out behind the plate of lenses, different effects may be presented.

If the two images to be exhibited are lightly different each other, by an angular displacement of the same scene, a tridimensional effect is visualized.

If on the contrary, the difference between an image and the other one corresponds to that which would be produced due to a virtual variation of time, then an animation effect is visualized. But this animation effect is actually reached through the visualization of very few frames (two through eight) due to the technique of composing the graphic pattern to be installed behind the lenticular plate.

Basically the structure of the graphic pattern of these devices consists in a screen formed by a plurality of lines having only a longitudinal resolution (parallel to the axis of the cylinder lenses), and arranged in such a way that the consecutive lines belong to consecutive images and two lines are separated in the same image by the same distance they occupied in the original image. Another characteristic of these graphic patterns is that below each cylinder lens, there shall be a complete set of lines belonging to all images to be visualized. All of this limits the number of different images that may be exhibited, and due to the accuracy with which the lines of the graphic pattern must be aligned with respect to the cylinder lenses, up to now the reduction of the number of images to be exhibited has been preferred, as well as the increase of the width of lines in order to absorb the alignment error.

Another family of optic arrangements using cylinder, converging, parallel multilenticular plates consists in devices allowing the exhibition of graphic images, which seem to follow the observer when the latter has a relative movement which is cross-sectional to the optic axis of the lenses. Depending on the structure of the graphic pattern installed behind the multilenticular plate, whether static or animated effects may be presented, which, in both cases, present before the observer notwithstanding that the latter has a relative movement with respect to the device.

The graphic patterns of this second family of exhibiting devices, unlike the first one, are formed by a plurality of strips which are parallel to the lenses. These strips have graphic information, both longitudinal and cross-sectional, and the observer must focus his sight on the infinity, which occurs automatically, that is to say, without the observer having to do any conscious handling in focusing.

In both families of devices, the possible animation effect is produced by the relative movement of the observer with respect to the device. In this respect, the exhibiting devices are passive, since different observers having different movements with respect to the exhibitor, observe different optic effects.

An important technical problem arising from both families of exhibiting devices is related to the techniques used to form the graphic patterns from the images it is desired to show. These techniques should try to be efficient both in the geometrical accuracy of the graphic pattern to be obtained, and in the speed and production costs of said graphic patterns.

We do not know more or less automatic techniques to handle the images in order to mix them as required to form the graphic patterns already mentioned.

SUMMARY OF THE INVENTION

The present invention offers a method and a device allowing to form graphic patterns to be used in exhibiting panels which use multilenticular plates made up of parallel and successive cylinder lenses and which have a preferably plain focal surface.

The method and device of the invention includes the storage of a plurality of data or digital information blocks, corresponding to the images to be exhibited. Each one of these blocks is processed by the device, which has the means to read the data blocks, said data of each block being then divided in n vertical bands, n being equal to the total number of cylinder lenses. Later, data corresponding to each band are divided in m sub-bands, m being equal to the number of images to be included in the graphic pattern. Only the data belonging to the sub-bands of the order mentioned below, shall be kept:

$$k_1{}^m + (j_1{}^n - 1) \times m$$

k being the k-times image and j the j-times band, with which an intermediate digital block is obtained for each initial data block corresponding to each initial image. Each one of these intermediate blocks gives rise to a terminal block formed by information corresponding to the medium lines of each sub-band selected, of a width of one pixel, keeping the memory address (position) of the corresponding sub-band. Finally, a block of data pattern is formed made up of the merger or integration of each one of the terminal block, keeping their relative addresses, juxtaposing the different sub-bands, which may be stored as a graphic file to be printed.

DESCRIPTION OF THE DRAWINGS

In order to understand the invention better, the same will be explained with the support of the following figures and sketches, where.

DETAILED DESCRIPTION OF THE INVENTION

Figure 1:
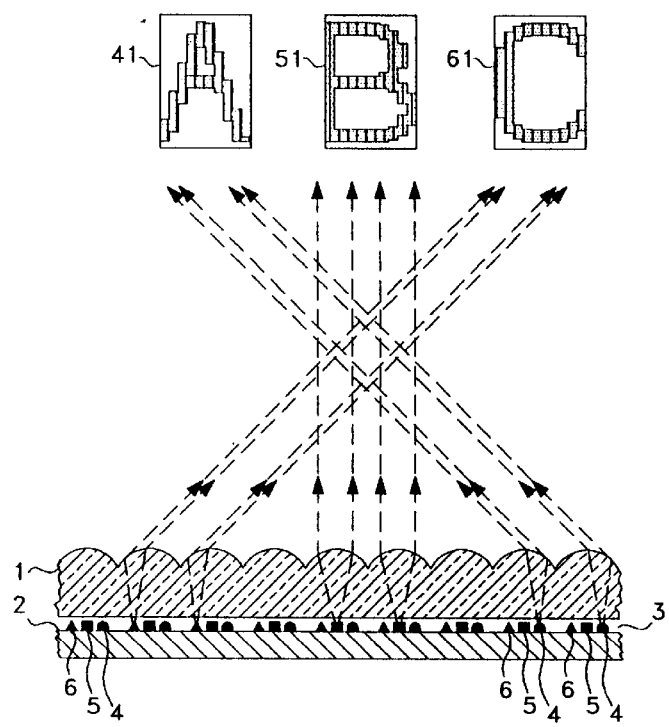
FIG. 1 depicts a cross-section of an exhibiting panel as those of the prior art, which uses graphic patterns which may be elaborated through the method and device of the invention.

FIG. 1 shows an example of the cross-section of an exhibiting panel of the prior art, which shall serve to understand the structure of the graphic patterns which are elaborated through the procedure and device of the invention. The exhibiting panel of this example consists in a multilenticular plate 1, formed by a plurality of cylinder lenses arranged parallel each other, which define a focal plane 2 where the graphic pattern 3 formed by a plurality of families of lines parallel to the geometrical axes of the cylinder lenses, is located. Each family of lines forming part of the graphic pattern 3 helps to the formation of a certain image. In FIG. 1 the lines belonging to each family have been depicted with a different geometrical symbol. Thus, a first family of lines 4, represented by a small semicircular area, allows to reconstruct the image 41 (letter "A" in this example). A second family of lines 5, represented by a small square area, allows to reconstruct the image 51 (letter "B" in this example). A third family of lines 6, represented by a small triangle area, allows to reconstruct the image 61 (letter "C" in this example).

As already known, the optic characteristics inherent of the systems of cylinder lenses allow that homolog points located in the focal plane of each lens are only seen from a certain visual angle. Strictly speaking, each point in the focal plane reflects light in different directions, but all rays of light coming from homolog points of the focal plane 2, that is to say, coming from points of said focal plane which are displaced in the same range and sense with respect to the optic axis of each lens, shall arise from the lenses in directions which are parallel each other, and in an angle depending on the displacement of each point of the graphic pattern 3 with respect to the geometrical axis of each lens.

According to the above, if each element (line) of the family of lines 4 is arranged in positions which are homolog to the focal plane 2 of each cylinder lens, it shall be seen from the same and determined angle, laterally amplified and covering the area of the corresponding lens, the image 41 being recreated or reconstructed. In a similar way, if the lines of the other families of lines 5 and 6 are located in homolog positions, but different from those used by other family of lines (belonging to other images to be recreated), they shall not be seen from the angle which is characteristic for the family of lines 4 and viceversa. In FIG. 1, and due to clarity reasons of the drawing, only the bright rays emerging from two lines of each family have been depicted, and which refract in certain angles, but actually all lines located in homolog positions of the focal plane 2 generate an image which is only seen from a certain angle and from which it is not possible to see the images which may be recreated from other families of lines which are in other relative positions of the focal plane 2.

Due to the optic considerations already mentioned as regards these lenticular systems of the prior art, there are two types of restrictions of a practical nature and which have limited the quality and applications of the exhibitors based on these principles.

A first practical limitation of the already known systems is the small number of images which may be physically included in the graphic pattern 3, since in the width corresponding to each lens, the information belonging to all images to be considered, must be included.

A second practical limitation of the already known systems is the accuracy with which the lines of each family shall be aligned (associated with the same image), so that they may be effectively seen from a certain angle, and in order to avoid that, due to alignment errors, lines belonging to different families of images are seen from a certain point of view.

A third practical limitation, resulting from the second limitation just mentioned, is related to the adjustments of parallax to be made at the moment of designing the graphic pattern, especially when the exhibitor-graphic pattern system has been considered to be seen from relatively short distances.

The limitations mentioned above bind the traditional systems of graphic patterns formation to make complex manual adjustments, with still less satisfactory results.

Figure 2:
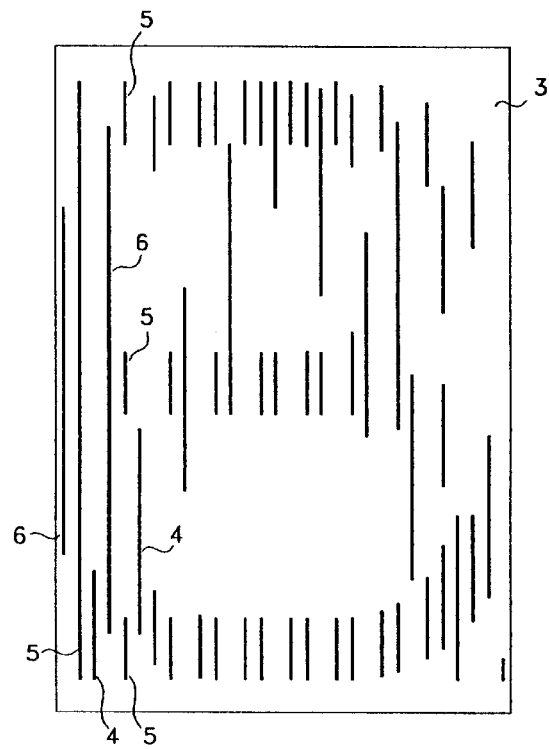
FIG. 2 depicts an example of the graphic pattern which may be used in the panel of FIG. 1 and which may be elaborated through the method and device of the invention.

A typical graphic pattern 3 to be exhibited in such devices as that of FIG. 1, has a structure as that shown in FIG. 2, where its components are a sequence of lines or bands 4, 5, . . . and 6, belonging to lines of successive original images intended to be reproduced.

Figure 3:
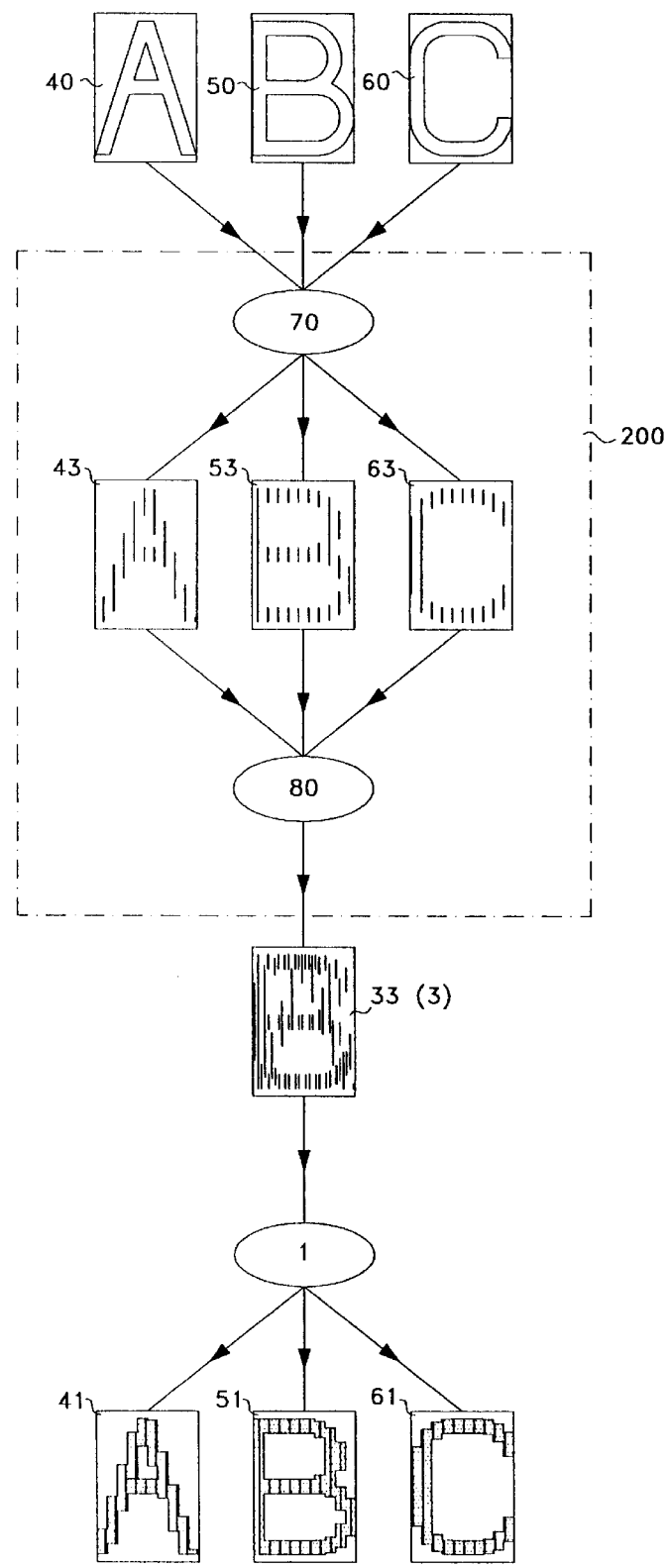
FIG. 3 is a flow chart of the basic operations forming part of the method of the invention and which is executed through the device offered by the same.
Figure 4:
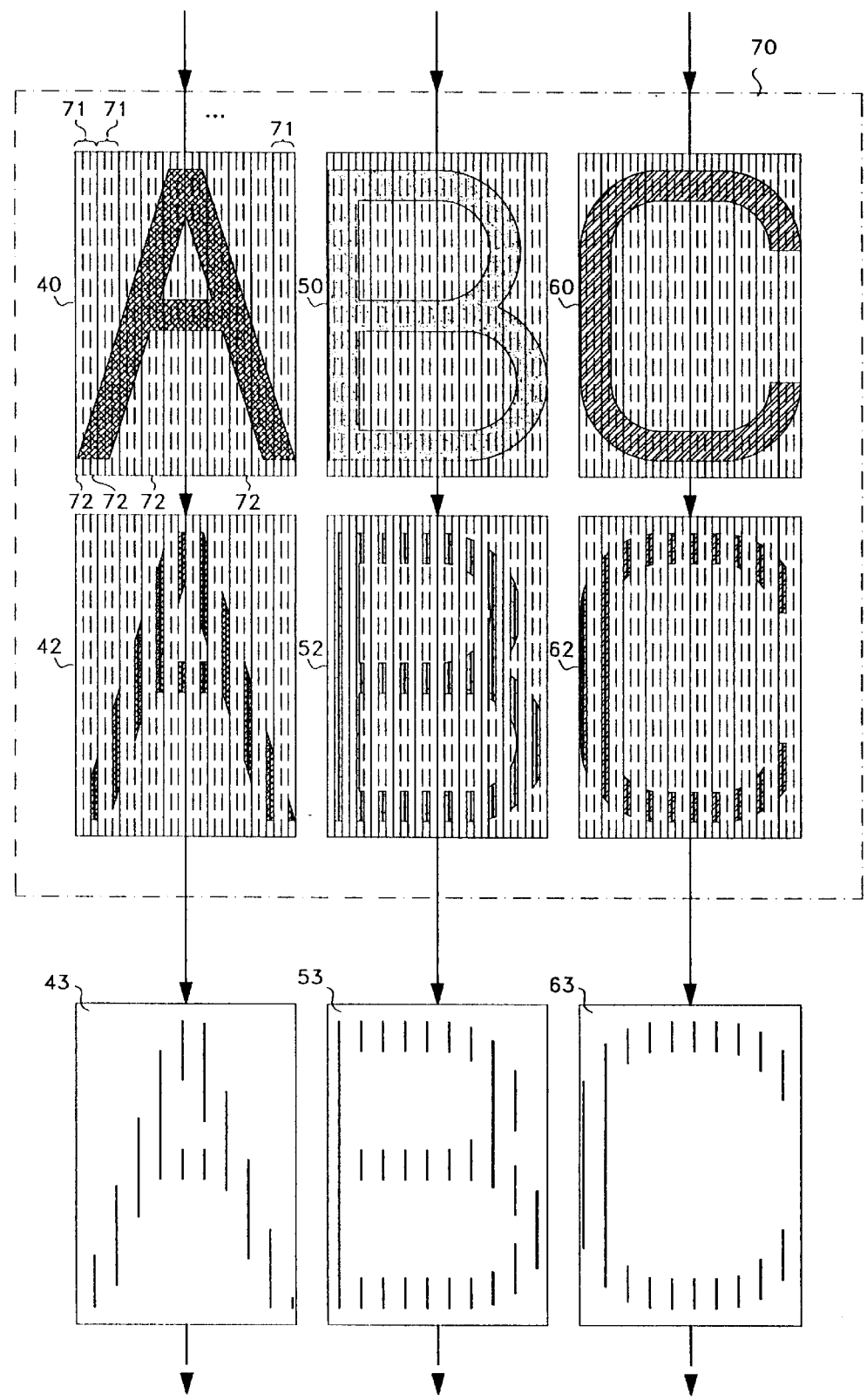
FIG. 4 shows a three-column sequence to illustrate the steps of one stage of the method of the invention.

A first approach to the procedure of the invention is sketched in FIG. 3, where block 200 represents the device which later executes said procedure. It is proceeded to store digital information blocks, or data blocks, 40, 50 . . . 60, which are obtained with a digital tracking device or equivalent, and which correspond to the digital information of each one of the corresponding original images intended to be included in the final graphic pattern 3. Each one of these digital data blocks are independently processed through a discretizing device 70 which carries out the following operations (see FIG. 4):

a) reading of a data block or digital file 40 or 50 . . . or 60;

b) division of the data of the corresponding block or digital file 40 or 50 . . . or 60 in as many vertical bands 71 as the number of cylinder lenses are considered in the exhibitor (n being the bands);

c) division of the data of the corresponding block or digital file 40 or 50 . . . or 60 of each one of the n bands in as many sub-bands 72 as different images are intended to be included (m being the number of different images), thus a total of nxm sub-bands being obtained:

d) to keep only the data belonging to the sub-bands belonging to the sub-band 72 of the order:

$$k_1{}^m + (j_1{}^n - 1) \times m$$

the k-times image and j the j-times band. This means that if, for example, there are three images (m=3, this implying that k varies from 1 to 3) and nine lenses (n=9, this implying that j varies from 1 to 9), there are 27 sub-bands (9×3). For the first image (data block 40) the data of all sub-bands for which k≠1, with 1≦j≦9, are eliminated, this means only the data of its original file 40 corresponding in this example to the bands of the order shown below, are kept:

1 (i.e., 1+[1−1]×3),
4 (i.e., 1+[2−1]×3),
7 (i.e., 1+[3−1]×3),
. . .
25 (i.e., 1+[9−1]×3)

for which k=1), thus an intermediate digital block 42 being obtained (see FIG. 4), which contains sub-bands which have been "picked out" from the initial data block 40;

e) to repeat the stages a) through d) for each image, so that in the stage d), cond image only sub-bands of its corresponding data block 50 (for which k=2), which—in the case of the prior example—means to keep the sub-bands of the order 2, 5, 8, 11, 14, . . . and 26, thus an intermediate digital block 52 being obtained. Likewise, for the third image, only sub-bands of its corresponding initial digital block 60 are kept (for which k=3), which means to keep the sub-bands of the order 3, 6, 9, 12, 15, . . . and 27, thus an intermediate digital block 62 being obtained;

f) obtaining of individual terminal data blocks 43, containing only information corresponding to the medium line of each sub-band 72 of a width of one pixel, and which keeps the memory address (position) of the corresponding sub-band (see FIG. 4).

Each one of the blocks of individual terminal data 43, 53, . . . 63 are processed with an integrating device 80 (see FIG. 3), which merges the data of them, keeping their relative addresses, this corresponding to juxtapose the different sub-bands in just one pattern block 33, which may be stored as graphic file for its later printing, thus the graphic patter 3 intended to be obtained, being generated.

In the stage f), the addresses of the data corresponding to one or more images may be displaced in a fixed quantity or in a quantity depending on the position of each one of the sub-bands, in order to introduce parallax adjustment or others which are suitable to compensate defects in the visualization of the resulting graphic pattern 3, by means of the multilenticular plate 1.

Figure 5:
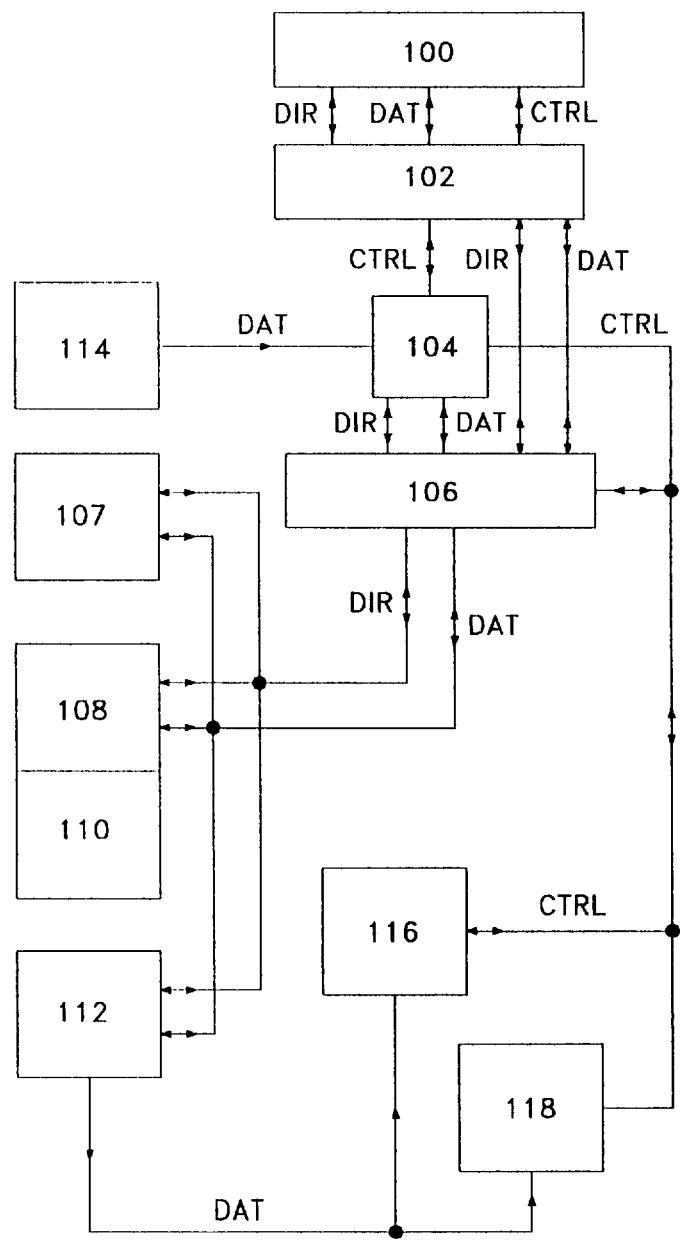
FIG. 5 is a block diagram of a preferred modality of the device of the invention to put the method of the same into practice.

The procedure described in the preceding stages may be put into practice by the electronic device shown in FIG. 5, in which an interphase 102 is included to communicate with your personal computer (PC), to which it is connected by an expanding bus 100. The device also has a central process unit (CPU) 104 associated with a read only memory (ROM) block 114 and with an interphase circuit for memories 106, the latter being linked with random access memories (RAM) 107, 108, 110 and 112. RAMs 108 are associated with the data blocks 40, 50 . . . 60, previously defined in the stage c), and RAMs 110 are associated with the intermediate block 42, 52, . . . , 62 previously defined in the stages d) and e), while RAMs 112 are associated with the pattern data block 33. The information stored in RAMs 112 may be read through video interphase circuits 116 and through interphase circuits for printing means 118. FIG. 5 has stated the types of connections associated with each block, and the same can be of three types according to the type of information signals carried by them: control signals CTRL, memory addresses DIR and data to be read or written DAT, depending on the control signal.

The set of operations necessary for the device of the invention to be able to execute the procedure, is already loaded in ROM 114 from which the different instructions are read by the CPU 104. The CPU also reads the data contained in RAMs 108, 110 and 112 as determined by the instructions then being executed. The temporary data generated in the different calculation operations are stored in RAM 107. When a calculation produces a final result, the CPU 104 commands the interphase for memories 106 for writing being executed in the corresponding address, that is to say, in some of the RAMs 108, 110 or 112.

What we claim is:

1. A method for the generation of printed images which define patterns to be used in graphic information exhibiting panels of the type made up of a plurality of cylinder, converging lenses arranged parallel each other, comprising the steps of:

a) storing of one or more data or digital information blocks, corresponding to the corresponding images intended to be exhibited; each one of these digital data blocks being processed by submitting them at least to the following operations:

a.a) reading of a data block or digital file;

a.b) division of the data of the corresponding block or digital file in n vertical bands, n being equal to the number of cylinder lenses which the exhibitor shall have;

a.c) division of the data of the corresponding block or digital file of each one of the n bands in m sub-bands, m being the number of different images to be included;

a.d) to keep only the data belonging to the sub-bands belonging to the sub-band of the order:

$$k_1{}^m + (j_1{}^n - 1) \times m$$

where k is the k-times image and i the j-times band, thus a corresponding intermediate digital block being obtained, which contains sub-bands which have been "picked out" from the corresponding initial data block;

a.e) to repeat the stages a.a) through a.d) for each image, so that the corresponding intermediate digital blocks are obtained;

a.f) obtaining of the corresponding individual terminal data blocks, which contain only information corresponding to the medium lines of each sub-band selected in the corresponding intermediate digital block of a width of one pixel, and which keeps the memory address (position) of the corresponding sub-band;

a.g) merger or integration of each individual terminal data block, keeping their relative addresses, and juxtaposing the different sub-bands in just one pattern block, which may be stored as graphic file for its later printing.

2. A device for the generation of printed images which define patterns to be used in graphic information exhibiting panels of the type made up of a plurality of cylinder, converging lenses arranged parallel each other, comprising an interphase to communicate with a personal computer (PC), to which it is connected by an expanding bus; a central process unit (CPU) associated with a read only memory (ROM) and with an interphase circuit for memories, through transfer conductors of control signals, data-reading and writing signals and addressing signals, said interphase for memories being linked at least with four blocks of random access memories (RAMs), through transfer conductors of control signals, data-reading and writing signals and addressing signals; a first RAM block being associated with the data blocks of the digital files or blocks corresponding to the corresponding images to be exhibited; a second RAM block being associated with intermediate digital blocks produced by the own calculation of the system; a third RAM block being associated with the resulting pattern data block, the information stored in this third RAM block can be read through video interphase circuits and through interphase circuits for printing means; a fourth RAM block being associated with the temporary data generated in the different calculation operations; the set of operations necessary for said device to be able to generate the printed images being loaded in said ROMs, from which the different instructions are read by the CPU, which also reads the data contained in said first, second and third RAM blocks, as determined by the instructions then being executed.

3. A printed pattern to be used in graphic information exhibiting panels of the type made up of a plurality of cylinder, converging lenses which are arranged parallel each other, and obtained through the method of claim 1.

4. A printed pattern to be used in graphic information exhibiting panels of the type made up of a plurality of cylinder, converging lenses which are arranged parallel each other, and obtained through the device of claim 2.

* * * * *